US009214780B2

(12) United States Patent
Tzuk

(10) Patent No.: US 9,214,780 B2
(45) Date of Patent: Dec. 15, 2015

(54) AEROSOL LASER

(71) Applicant: Yitshak Tzuk, Rehovot (IS)

(72) Inventor: Yitshak Tzuk, Rehovot (IS)

(73) Assignee: Soreq Nuclear Research Center, Nahal Soreq, Yavne (IL)

( * ) Notice: Subject to any disclaimer, the term of this patent is extended or adjusted under 35 U.S.C. 154(b) by 0 days.

(21) Appl. No.: 14/359,363

(22) PCT Filed: Nov. 20, 2012

(86) PCT No.: PCT/US2012/065965
§ 371 (c)(1),
(2) Date: May 20, 2014

(87) PCT Pub. No.: WO2013/078154
PCT Pub. Date: May 30, 2013

(65) Prior Publication Data
US 2014/0348199 A1 Nov. 27, 2014

(51) Int. Cl.
*H01S 3/16* (2006.01)
*H01S 3/03* (2006.01)
H01S 3/094 (2006.01)
H01S 3/223 (2006.01)
H01S 3/23 (2006.01)

(52) U.S. Cl.
CPC . *H01S 3/03* (2013.01); *H01S 3/169* (2013.01); H01S 3/094038 (2013.01); H01S 3/094076 (2013.01); H01S 3/1611 (2013.01); H01S 3/223 (2013.01); H01S 3/2308 (2013.01)

(58) Field of Classification Search
CPC ................. H01S 3/169; H01S 3/223–3/227
See application file for complete search history.

(56) References Cited

U.S. PATENT DOCUMENTS

2007/0189351 A1   8/2007  Rice
2007/0280304 A1*  12/2007 Deile et al. ............... 372/6

OTHER PUBLICATIONS

PCT Search Report PCT/US2012/065965, May 27, 2013.
Yitshak Tzuk et al. "Nanoparticle dispersion laser", Optics Letters, OSA, vol. 37, No. 5, Mar. 1, 2012, pp. 939-941.
Basov et al., "Proposal for lasers utilizing dye solution aerosols", Soviet Journal of Quantum Electronics, American Institute of Physics, New York, NY, USA, vol. 10, No. 1, Jan. 1, 1980, pp. 108-110.
Taniguchi et al., "Lasing behavior in a liquid spherical dye laser containing highly scattered nanoparticles", Optics Letters, vol. 21, No. 4, Feb. 15, 1996, pp. 263-265.
Yu et al., "Enhanced photoluminescence of Nd2O3 nanoparticles modified with silane-coupling agent: Fluorescent resonance energy transfer analysis", Applied Physics Letters, American Institute of Physics, Melville, NY, USA, vol. 90, No. 9, Feb. 28, 2007 pp. 091916-1 to 091916-3.

* cited by examiner

*Primary Examiner* — Colleen A Matthews
*Assistant Examiner* — Sean Hagan
(74) *Attorney, Agent, or Firm* — Dekel Patent Ltd.; David Klein

(57) ABSTRACT

A laser device including lasing materials composed of nanoparticles in an aerosol phase. One example is Nd2O3 in DMDCS with DMSO which is sprayed into a cuvette, measures have to be taken to prevent for aggregation. The fluorescence life-time is significantly shorter compared to nanoparticles dissolved in a liquid.

10 Claims, 4 Drawing Sheets

```
┌─────────────────────────────┐
│       LASER CAVITY          │
│ ┌─────────────────────────┐ │         ┌──────────────────────┐
│ │ VESSEL CONTAINING A LASING│         │  PUMP FOR SUPPLYING  │
│ │ MATERIAL BEING AN AEROSOL │         │ LASER PUMP POWER TO  │
│ │ OF LASANT NANO-PARTICLES  │         │      THE VESSEL      │
│ │  SUSPENDED IN A GAS       │         └──────────────────────┘
│ └─────────────────────────┘ │
└─────────────────────────────┘

┌──────────────────────┐              ┌──────────────────────┐
   │  MEANS FOR SPRAYING  │              │      MEANS FOR       │
   │     THE AEROSOL      │              │  CIRCULATING THE     │
   │                      │              │       AEROSOL        │
   └──────────────────────┘              └──────────────────────┘

┌────────────────────────────┐        ┌──────────────────────┐
   │    MEANS FOR AVOIDING      │        │  MEANS FOR COUPLING  │
   │    AGGREGATION OF THE      │        │  THE LASER BEAM OUT  │
   │ PARTICLES AND MAINTAINING  │        │     OF THE CAVITY    │
   │  A HOMOGENOUS PARTICLE     │        └──────────────────────┘
   │       DISTRIBUTION         │
   └────────────────────────────┘
```

FIG. 8

AEROSOL LASER

FIELD OF THE INVENTION

The present invention relates generally to high power lasers that utilize a gain medium in the aerosol phase.

BACKGROUND OF THE INVENTION

A well-known drawback of high power solid state lasers is that they suffer from thermo optic distortions that limit ultimately the amount of optical power that can be generated.

It is also well known that some problems with solid state lasers can be partially solved by the use of a gain medium having a liquid form as described in Patent Applications No US2003/0161364 by Michael D. Perry entitled "Laser Containing a Slurry" and No WO2007/095246 by Robert R. Rice entitled "Liquid Laser with Colloidal Suspension of Lasant Nanoparticles".

Perry describes a liquid laser in which the gain medium comprises particles of a solid state material suspended within a fluid having a refractive index substantially similar to that of the particles. This slurry is circulated between a resonator and a cooling system, functioning therefore both as the gain medium and as a coolant. A drawback of this approach is that there must be a close match between the indices of refraction of the solid state particles and the liquid to avoid considerable Mie scattering losses.

Rice describes a liquid laser in which the gain medium comprises a liquid with nanoparticles of a solid state lasing material in a colloidal state. Due to the small dimension of the particles, losses incurred by Mie scattering of the laser light are less dependent on the indices' of refraction difference and generally negligible.

These liquid gain media are prone however to thermo optic distortions due, for example, to non-homogeneous pump-light distribution, large index of refraction dependency in temperature (dn/dT) or inhomogeneous flow. Accordingly, although the use of nanoparticles alleviates the index mismatch problem, there is still a need for improvement because of the abovementioned restrictions, as well as other issues associated with liquid gain media, such as quenching and the limited range of transparency of fluids.

SUMMARY OF THE INVENTION

The present invention seeks to provide a laser in which the lasing material consists of nanoparticles of either a solid-state, liquid or semiconductor lasing material, being in an aerosol phase dispersed in gas, as is described more in detail hereinbelow. The nano-particles result in insubstantial scattering of pump or laser light, while the gas medium lessens substantially the optical distortions induced by non-homogenous pump illumination or non-homogenous flow and low dn/dT, alleviates quenching and allows the laser to operate in a substantially wider spectral window. Therefore the advantages of a nano-particle aerosol laser are more fully achieved and in particular higher power levels can be attained in a wider spectral band without the disadvantage of thermal lensing associated with non-homogeneities in liquid lasers.

BRIEF DESCRIPTION OF THE DRAWINGS

The present invention will be understood and appreciated more fully from the following detailed description, taken in conjunction with the drawings in which:

FIG. 8 is a simplified block diagram of a laser device, in accordance with an embodiment of the present invention.

DETAILED DESCRIPTION OF EMBODIMENTS

In general terms, as seen in FIG. 8, the laser device of the invention consists of a laser cavity that encompasses a vessel containing a lasing material being an aerosol of lasant nanoparticles suspended in a gas, a pump for supplying laser pump power to the vessel, means for spraying the aerosol (such as a nebulizer), means for circulating the aerosol, e.g., for cooling purposes (such as a fan), means for avoiding aggregation of the particles and maintaining a homogenous particle distribution, and means for coupling the laser beam out of the cavity. Aggregation can be avoided in different ways, such as by using a surfactant that covers each particle, or by transmitting the particles through high voltage electrodes in order to charge the particles and achieve electrostatic rejection, or by heating the pipes to high temperatures to add kinetic energy to the particles that overcomes the adherent forces.

The lasant nanoparticles, selected for their desired optical and physical properties, are manufactured from either a solid-state, liquid or semiconductor lasing material. As a non-limiting example the aerosol may be composed of nanoparticles of lanthanoid ceramic or oxide materials, such as $Nd_2O_3$, Nd:YAG or $Nd:LaF_3$, or nanoparticles of quantum dots. In particular the aerosol may be composed of at least two different materials, selected to produce lasing at several wavelengths.

The gas carrying the nanoparticles is selected to be transparent at the wavelengths of interest, to be chemically stable, to have properties consistent with maintenance of an aerosol phase in which the aggregation of the nanoparticles is minimized. In particular the gas may possess luminous or lasing properties that are activated by the nanopartcles' originating laser radiation. The gas circulation can be carried out in such a way that it cools the gas (for example by expansion) allowing so, inter alia, for more efficient lasing.

Some non-limiting features of the invention include:

Aerosol parameters such as its composition, particle size and density.

Gas parameters such as its composition and flow.

Parameters describing the operational regime of the laser.

The inventors measured the fluorescence lifetime, fluorescence spectrum, gain and lasing properties of a dispersion of 5% wt $Nd_2O_3$ nanoparticles modified with dimethyldichlorosilane (DMDCS) in dimethylsulfoxide (DMSO), which was manufactured by nanograde LLC. The 2 nm diameter of the modified $Nd_2O_3$ nanoparticles was measured using a zetasizer by Malvern instruments.

Figure 1:
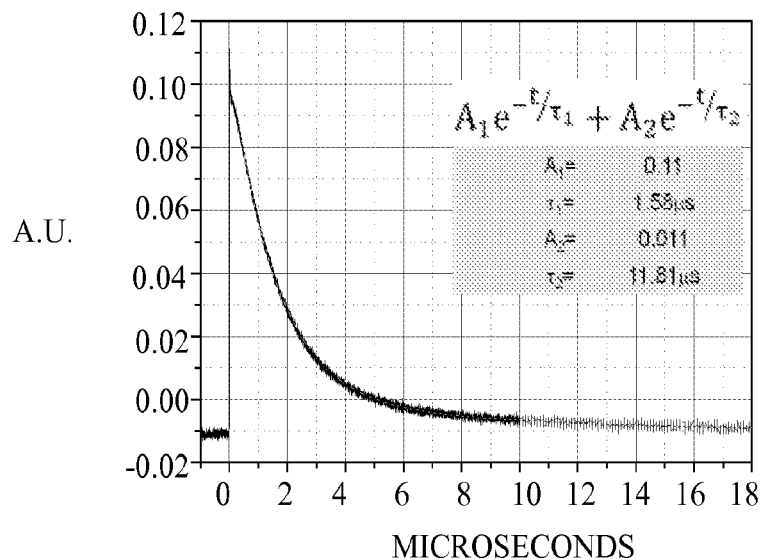
FIG. 1 is a simplified graphical illustration of the fluorescence lifetime from the nanoparticle dispersion, pumped with 7 nsec pulse @ 802 nm, in accordance with an embodiment of the present invention.

The fluorescence lifetime of these nanoparticles, pumped with a 7 ns, 14 mJ, 802 nm pulse from an OPO system is plotted in FIG. 1. The pump was focused using a 50 cm lens on a 1 cm quartz cuvette filled with the nanoparticle dispersion. The fluorescence exhibits biexponential behavior with a 10:1 ratio of the faster to slower decay times. The faster decay time equals 1.6 µs and the slower decay time equals 11.8 µs. These decay times are much shorter than the decay time of 492 µs measured for the 25 nm nanoparticles by Yu et al. (that is, Rongbiao Yu, Kehan Yu, Wei Wei, Xiangxing Xu, Xiaoming Qiu, Shuyi Liu, Wei Huang, Gordon Tang, Harold Ford, and Bo Peng, "$Nd_2O_3$ Nanoparticles Modified with a Silane Coupling Agent as a Liquid Laser Medium", Adv. Mater. 19, 838-842, (2007)).

Figure 2:
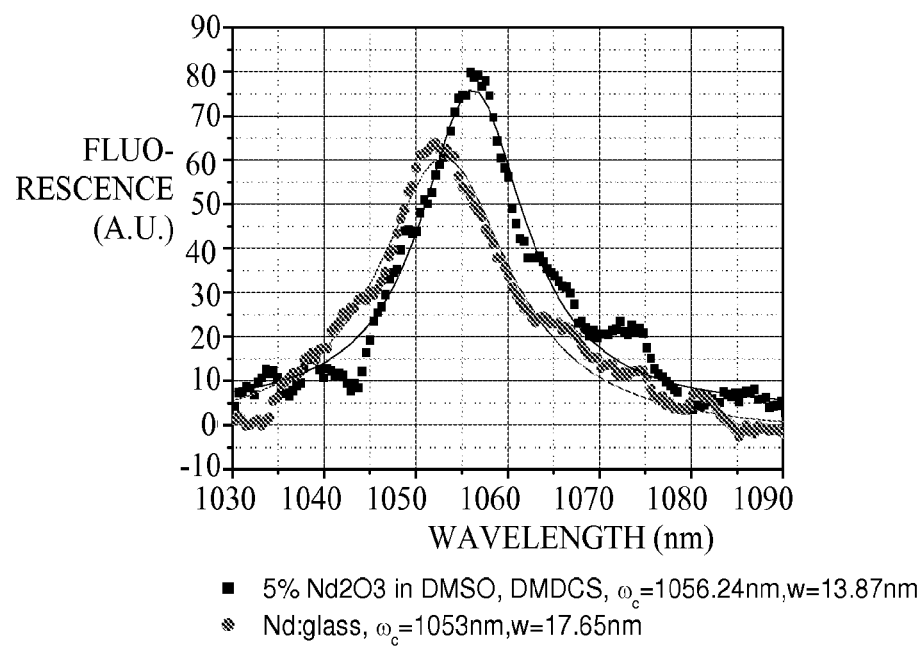
FIG. 2 is a simplified graphical illustration of the fluorescence spectrum of the nanoparticle dispersion and of Phosphate ($N_{31}$) Nd:glass, in accordance with an embodiment of the present invention.

The fluorescence spectrum of the nanoparticle dispersion was compared to a 5 mm thick 4% Phosphate Nd:glass disk ($N_{31}$) and pumped with a 7 ns, 14 mJ, 802 nm pulse from an OPO system. The spectrum was measured using an Ocean Optics fiber coupled spectrometer and is plotted in FIG. 2. The Lorentzian curve fit for the fluorescence from the Nd:glass is centered on 1053 nm and has a width of 17.65 nm. The Fluorescence from the nanoparticles is slightly shifted and is centered on 1056 nm with a 13.87 nm width.

Figure 3:
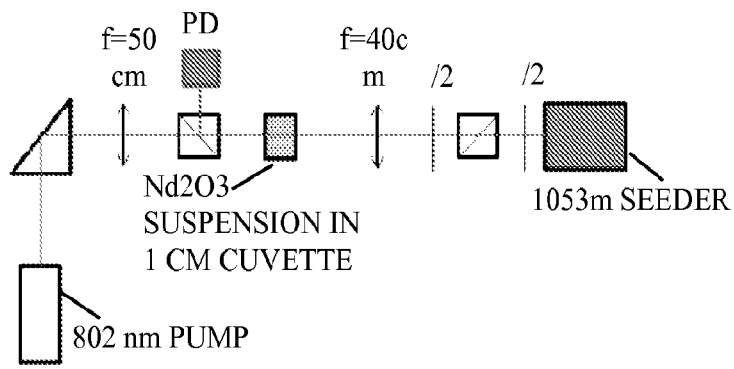
FIG. 3 is a simplified illustration of an experimental setup for the gain measurement, in accordance with an embodiment of the present invention.

The experimental setup for the gain measurement is shown in FIG. 3. A 7 ns, 13 mJ, 802 nm pulse from an OPO system was focused with an f=50 cm on a 1 cm quartz cuvette containing the nanoparticle dispersion. A CW Nd:YLF @ 1053 nm seeder was focused on the quartz cuvette, with an f=40 cm lens from the opposite direction. The polarizations of the two lasers were perpendicular and controlled by waveplates. After propagating through the cell the seeder was reflected onto a fast photodiode with a 3 ns responds time.

Despite the bad quality of the OPO pump beam a gain of 1.6 was measured from the dispersion. The gain measurement decreases after 100 ns due to thermal lensing of the dispersion.

Figure 5:
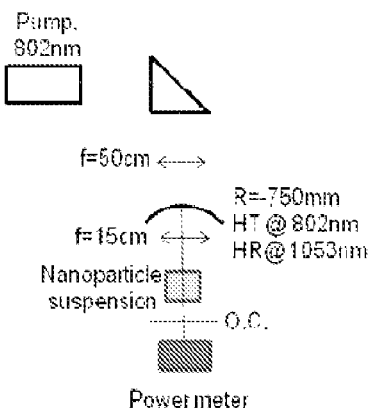
FIG. 5 is a simplified illustration of laser setup, in accordance with an embodiment of the present invention.

The experimental setup for the nanoparticle laser is shown in FIG. 5. The pump is coupled into the cavity using an f=50 cm lens. The cavity consists of an R=−750 mm back mirror, a flat output coupler (OC) and an f=15 cm lens, for matching the size of the laser to the cavity.

Figure 4:
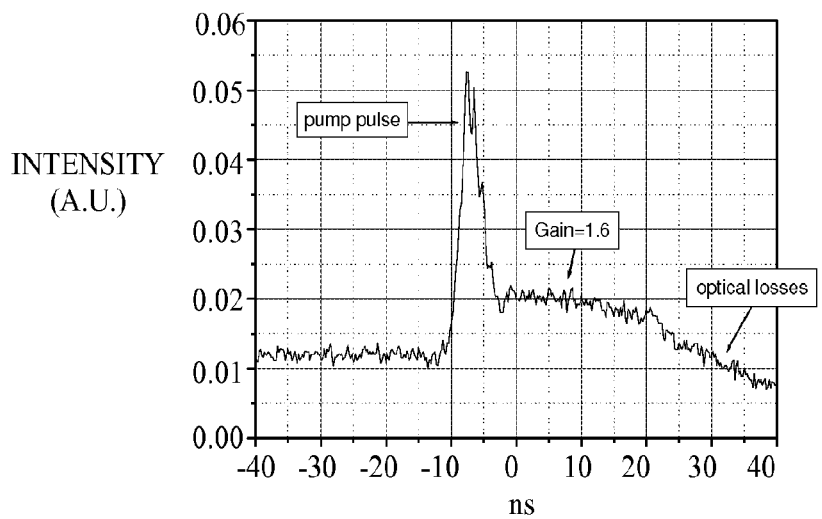
FIG. 4 is a simplified graphical illustration of gain and optical losses, in accordance with an embodiment of the present invention.
Figure 6:
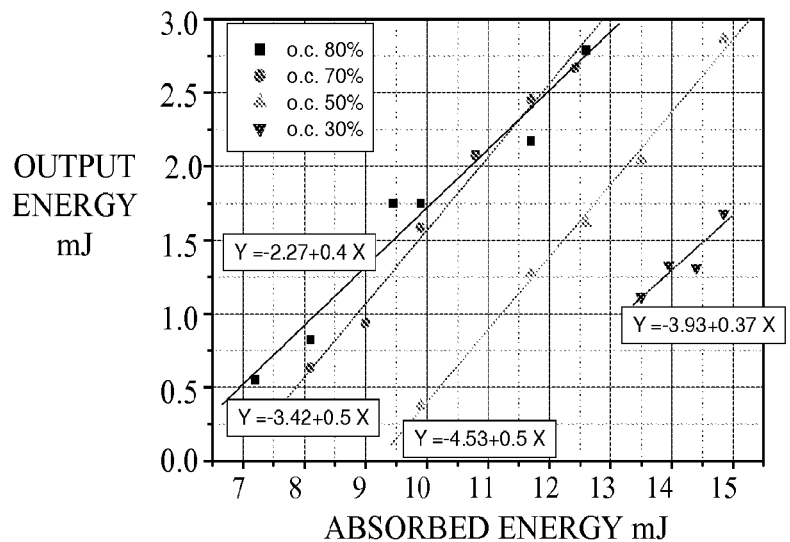
FIG. 6 is a simplified graphical illustration of the output from the nanoparticle laser, for different OC, vs. increasing the pump energy, in accordance with an embodiment of the present invention.

The output energy of the laser vs. absorbed energy for various OC is plotted in FIG. 6. The maximum output energy was 2.7 mJ. The fact that there was a laser with an O.C. of 30% and the inventors used an uncoated cuvette indicates that the gain is at least 1.98. The gain plotted in FIG. 4 is lower due to thermal lensing and mismatch between the seeder and OPO beam shapes.

Figure 7:
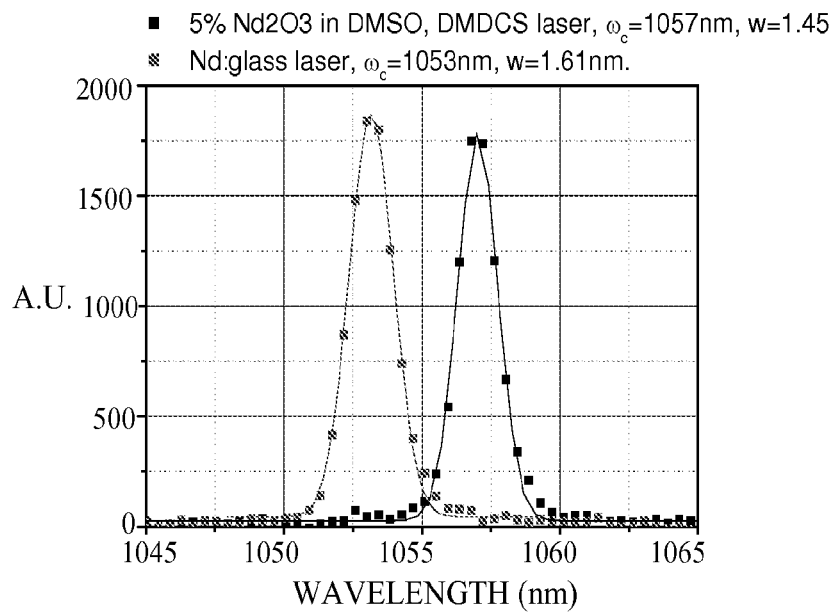
FIG. 7 is a simplified graphical illustration of the spectra of the nanoparticle suspension and Nd:glass lasers, in accordance with an embodiment of the present invention.

The spectra of the nanoparticle suspension laser and of an Nd:glass laser are plotted in FIG. 7. The Gaussian curve fit of the nanoparticle suspension is centered at 1057 nm whereas the curve fit of the Nd:glass laser is centered at 1053 nm.

What is claimed is:

1. A laser device comprising:
a laser cavity that encompasses a vessel containing a lasing material which is an aerosol of lasant nanoparticles of lanthanoid ceramic or oxide materials, having a 2 nm diameter, suspended in a gas.

2. The laser device according to claim 1, further comprising a pump for supplying laser pump power to said vessel, means for spraying said aerosol, and means for circulating said aerosol.

3. The laser device according to claim 1, further comprising means for avoiding aggregation of said nanoparticles and maintaining a homogenous distribution of said nanoparticles.

4. The laser device according to claim 1, further comprising means for coupling a laser beam out of said laser cavity.

5. The laser device according to claim 3, wherein the means for avoiding aggregation of said nanoparticles and maintaining a homogenous distribution of said nanoparticles comprises a surfactant that covers said nanoparticles.

6. The laser device according to claim 3, wherein the means for avoiding aggregation of said nanoparticles and maintaining a homogenous distribution of said nanoparticles comprises a transmitter for transmitting said nanoparticles through high voltage electrodes in order to charge said nanoparticles and achieve electrostatic rejection.

7. The laser device according to claim 3, wherein the means for avoiding aggregation of said nanoparticles and maintaining a homogenous distribution of said nanoparticles comprises a heater for adding kinetic energy to said nanoparticles that overcomes adherent forces.

8. The laser device according to claim 1, wherein said lasant nanoparticles have a fluorescence having at least 10:1 ratio of faster to slower decay times.

9. The laser device according to claim 1, wherein the faster decay time equals 1.6 µs and the slower decay time equals 11.8 µs.

10. The laser device according to claim 1, wherein a fluorescence spectrum of said lasant nanoparticles is centered on 1056 nm with a